W. J. SCOTT.
TESTING MACHINE.

No. 169,376.  Patented Nov. 2, 1875.

UNITED STATES PATENT OFFICE.

WILLIAM J. SCOTT, OF ALBANY, NEW YORK, ASSIGNOR TO FRANCES A. SCOTT, OF SAME PLACE.

IMPROVEMENT IN TESTING-MACHINES.

Specification forming part of Letters Patent No. 169,376, dated November 2, 1875; application filed August 27, 1875.

*To all whom it may concern:*

Be it known that I, WILLIAM J. SCOTT, of the city and county of Albany and State of New York, have invented a new and useful Machine for Testing the Tensile Strength and Elasticity of Leather or other material, of which the following is a full and exact description, reference being had to the accompanying drawing making a part of this specification, in which—

Figure 1:
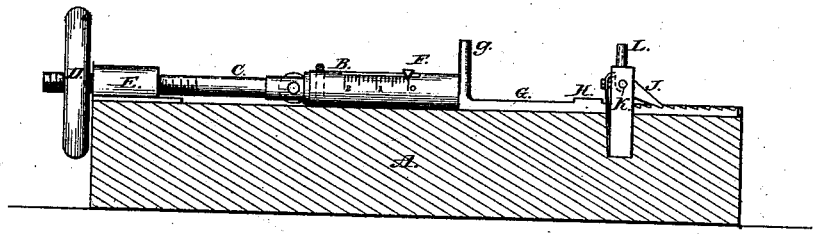
Figure 2:
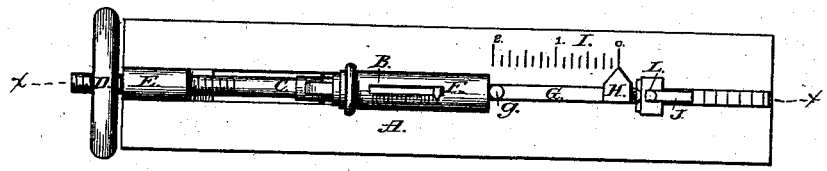

Figure 1 is a longitudinal section through the line $x\ x$, and Fig. 2 a plan view, of my machine.

My invention consists of the devices herein shown and described, so arranged that the strain put upon the leather or material being tested is indicated in pounds or fractions thereof, and the elastic properties of it is indicated by a scale of inches or parts thereof.

As shown in the drawing, A is the bed-piece of the machine. B is a spring-scale, (which may be made in any form most suitable for this purpose,) and upon which is a graduated scale, showing the pounds and the usual fractional parts thereof. C is a screw, attached to one of the working parts of the scale B. D is a hand-wheel, having a screw-thread cut through its center to fit the screw C, and serving as a nut therefor. Its hub bears against the boss E, through which the screw passes freely, and which forms an abutment, for receiving the strain of the screw when the power is applied to it. F is the index, commonly used for scales of this kind for showing the weight or power applied. G is a ratchet-rack, attached to the opposite end of the scale B. It is provided with a spur, $g$, to which one end of the material to be tested is secured. It is also provided with an index, H, for showing, by the scale 1 of parts of an inch, the endwise movement of the rack G. J is a spring-pawl, which engages in the ratchet-teeth of the rack G. It is fulcrumed on the pin K, and is provided with a spur, L, on its upper side, to which the other end of the material under test is secured.

In testing by this machine, a strip of leather or other material should be cut of sufficient length to secure the ends, by means of incisions made therein, or by any other means, to the spurs $g$ and L. When the material is thus secured the screw C is drawn by means of the hand-wheel D, so as to apply a strain upon it. The first impulse of this strain serves to disengage the hold of the spring-pawl J from the rack G, leaving the rack free to be drawn out as the material stretches under the strain to which it is subjected.

If it is desired to determine the degree of permanent stretch acquired by the material during the test, under any strain below the point of rupture, it can be correctly accomplished in the following manner: The movement of the index H on the scale I, due to the combined elasticity and stretch of the material, is first noted. Then, by turning back the hand-wheel D until the elasticity of the material is expended, (which can be determined by its slackening so as to permit the spring-pawl J to fall into the teeth of the rack G,) and then noting the position of the index H on the scale I, the degree of elasticity is shown by the distance that the index has receded on the scale. The balance of the distance it has moved beyond the zero-point, from which the elasticity of the material has failed to move it, indicates the amount of stretch it has acquired.

By noting the travel of the rack G, as shown by the index H and scale I, in the manner above described, the degree of elasticity of the material, as distinguished from its stretching properties, can be readily determined; and by noting the strain to which it is subjected, as indicated by scale B, a comparison may be made of the strength, elasticity, and the stretching properties of the materials tested, thereby enabling those interested to determine the quality of the different kinds of materials best suited for their purpose.

Should sufficient force be applied to tear asunder the material being tested, the spring-pawl J instantly becomes free and engages in the rack G, thereby holding it at the point at which the rupture occurred, and automatically indicating the strain applied and the elasticity of the material.

I do not claim the use of a scale for showing the strain applied with an indicator for showing the degree of elasticity of the material, when the scale is held in a fixed position, and the indicator is moved directly by the device for applying the strain to the material, as I am aware that such an apparatus has heretofore been constructed; but

What I claim as my invention is—

1. A testing-machine constructed substantially as herein shown and described, and consisting of a scale for determining the amount of power applied, and an indicator, fixed to a movable part of said scale, for showing the degree of elasticity of the material when subjected to the power indicated, in the manner and for the purposes herein specified.

2. The combination of the spring-scale B with the sliding rack G and spring-pawl J, as and for the purpose specified.

WILLIAM J. SCOTT.

Witnesses:
- JAS. D. WALSH,
  RICHD. H. SCOTT,
  FRANKLIN W. SCOTT.